United States Patent [19]

Taylor, Jr. et al.

[11] 4,041,491
[45] Aug. 9, 1977

[54] METHOD AND APPARATUS FOR DETERMINING THE ALTITUDE OF A SIGNAL PROPAGATION PATH

[75] Inventors: John W. Taylor, Jr.; Carl A. McGrew, both of Baltimore, Md.

[73] Assignee: Westinghouse Electric Corporation, Pittsburgh, Pa.

[21] Appl. No.: 631,976

[22] Filed: Nov. 14, 1975

[51] Int. Cl.² .......................................... G01R 29/08
[52] U.S. Cl. ............................... 343/100 R; 325/67; 343/5 W
[58] Field of Search ................. 343/17.7, 5 W, 100 R; 325/67

[56] References Cited

PUBLICATIONS

IEEE Transactions on Antennas and Propagation, pp. 132–136, Jan. 1975.

IEEE Transactions on Antennas and Propagation, pp. 794–796, Nov. 1971.

Primary Examiner—Maynard R. Wilbur
Assistant Examiner—Richard E. Berger
Attorney, Agent, or Firm—C. F. Renz

[57] ABSTRACT

A method and apparatus for determining the altitude of a transmitted signal by adding the altitude of the transmitting antenna to accumulated changes in altitude, determined in relation to the sine function of the elevation angle of the propagation path. The elevation angle of the propagation path is determined in relation to the elevation angle of the transmitting antenna and the local elevation angle change in the propagation path accumulated over the propagation range. The local elevation angle change in the propagation path is determined in relation to a dynamic, vertically dependent refractive index gradient model and in relation to a vertically dependent curvature model.

37 Claims, 9 Drawing Figures

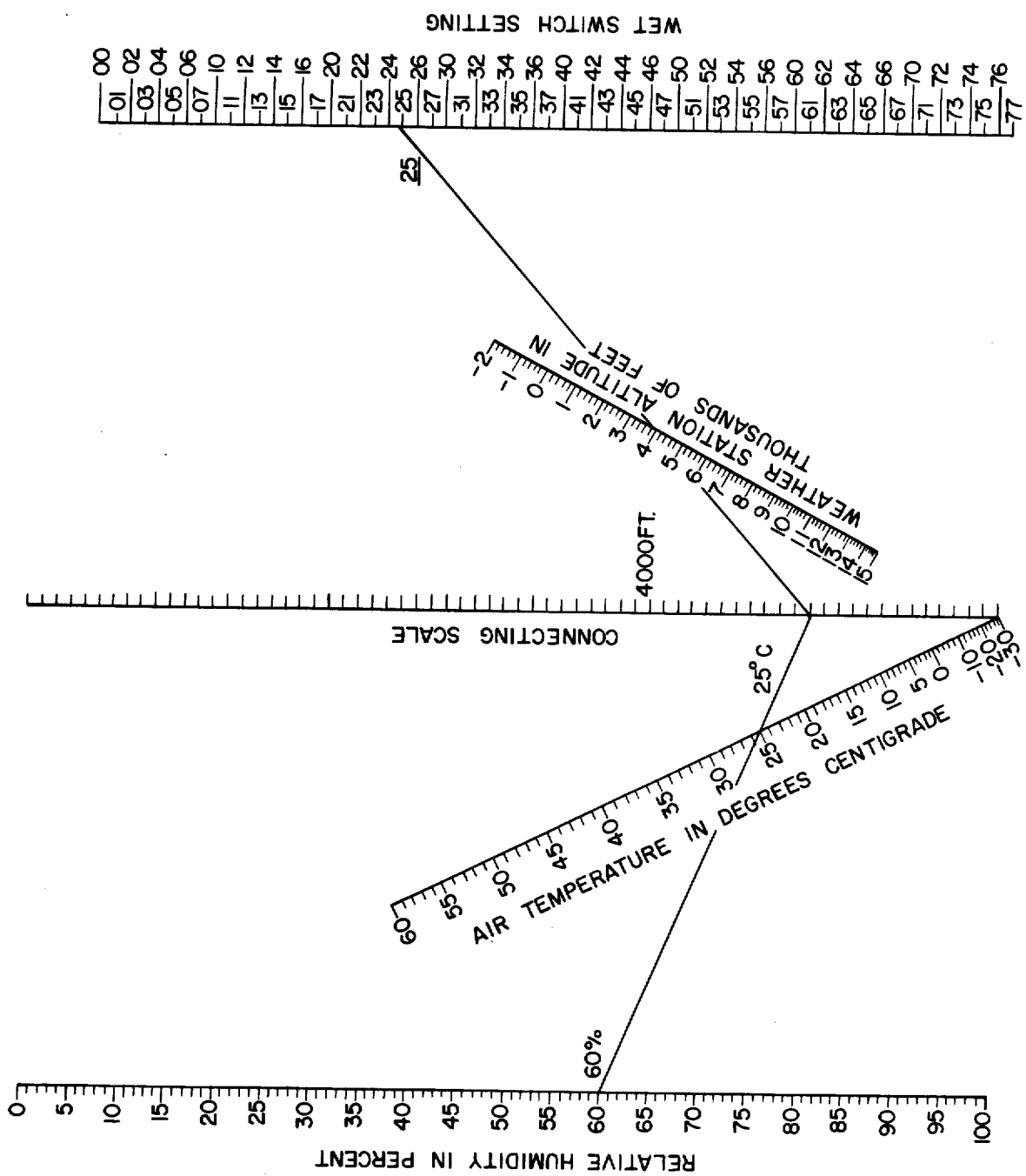

METHOD AND APPARATUS FOR DETERMINING THE ALTITUDE OF A SIGNAL PROPAGATION PATH

BACKGROUND OF THE INVENTION

1. Field of the Invention:

The invention relates to methods and apparatus for determining the altitude of a signal propagation path.

2. Description of the Prior Art:

Cognizance of the effects of the atmospheric refractive index gradient is essential to an accurate determination of the altitude of electromagnetic or radio signals propagated through the lower atmosphere. Normally, the refractice index gradient causes a downward curvature of horizontally launched electromagnetic signals which is about one-fourth that of the earth. However, under unusual meteorological conditions, the radio energy may be confined to thin layers near the earth's surface with resultant abnormally high field strength being observed beyond the normal radio horizon. At other times a transition layer between differing air masses will give rise to the reflection of radio energy. In addition to these gross profile effects, the atmosphere is always more or less turbulent, with the result that radio energy is scattered out of the normal antenna pattern. In addition to the vertical structure of the atmospheric index, there are variations associated with changing latitude and longitude as well as temporal (diurnal and seasonal) variations which are directly related to the energy balance of the earth. No standard compensation for radio wave curvature, can provide acceptable accuracy under the wide range of temperature and humidity conditions encountered.

In the prior art, signal range and antenna elevation angle have been employed in three basic methods for determining the altitude of a transmitted radar pulse. The first method assumes that the earth is flat and determines altitude by multiplying the pulse range (R) by the sine of the elevation angle ($\theta$). This "flat earth" method may be mathematically expressed as:

$$H = R \sin \theta \tag{1}$$

The second method assumes that the earth is a sphere of radius $R_e$, having no atmosphere. Altitude is determined from an approximation obtained by expanding the exact solution of a quadratic equation developed from the geometry of a spherical earth and a straight line path of the radar pulse. This "spherical earth — no atmosphere" method may be mathematically expressed as:

$$H = R \sin \theta + R^2/(2R_e) \tag{2}$$

The second term in the right side of equation (2) is, in effect, a correction for the assumption of a flat earth made in the first method. The third method assumes a spherical earth with a particular type of atmosphere. This method attempts to account for the curvature or bending in the signal propagation path which is due to spatial variations in the atmospheric index of refraction. A constant refractive index curvature is simply added to the curvature of the earth. The radius of the resulting curve is an effective earth's radius, $R_{ef}$ which is a factor (K) times the actual earth's radius, $R_e$, used to determine altitude in the second method. This "effective earth radius" method can be mathematically expressed as:

$$H = R \sin \theta + R^2/(2R_{ef}) \tag{3}$$

where $R_{ef} = KR_e$

Since a typical value for the constant K for an average atmosphere over the continential United States is (4/3), this method is also known as the "4/3 — earth's radius method".

The "flat earth" and "spherical earth-no atmosphere" methods ignore the effects of the atmospheric refractive index gradient and therefore inaccurately determine the altitude of electromagnetic signals propagated through the atmosphere. Most prior art signal processes which have attempted to account for the effects of the atmospheric refractive index gradient have determined altitude based on the "effective earth's radius" method assuming that the curvature of the propagation path is constant regardless of the altitude of the propagation path or the initial elevation angle of the transmitted signal. Since the propagation path depends on non-linear, dynamic spatial variations in the index of refraction of the propagation atmosphere, the accuracy of this prior art method has also been limited.

Some prior art data processors have utilized a realistic atmospheric model to determine signal propagation curvature caused by the refractive index gradient but this has not been done on a real-time basis. These data processors have determined altitude as a function of range, with the transmitting antenna elevation angle and range as input data so that a continuous, real-time altitude determination is impossible. Under these circumstances, altitude can be determined only by an iterative search for the altitude which is appropriate for the input range. Such iterative methods make these prior data processors highly unsuitable for high speed applications. In addition, these prior art data processors fail to compute accurately if the signal propagation path approaches a line tangent to the earth's surface because one of the calculated parameters approaches infinity. In practice, however, the signal propagation path can become tangential to the earth's surface under typical atmospheric conditions when the signal is launched at a negative angle, or when atmospheric conditions cause sufficient curvature to overcome an initial positive transmission angle.

SUMMARY OF THE PRESENT INVENTION

A digital, real-time signal processor determines the altitude of an electromagnetic signal in relation to the time of transmission, the altitude of the transmitting antenna, and an elevation angle of the signal propagation path. The elevation angle is determined in relation to the elevation angle of the transmitting antenna and local elevation angle changes in the propagation path due to the atmospheric refractive index gradient and the curvature of the reference sphere relative to the propagation path. The local elevation angle change caused by the atmospheric refractive index gradient is determined in relation to an atmospheric model comprised of a dry term and a wet term selected in relation to current atmospheric conditions and in vertically dependent relation to a multiple of predetermined altitude zones. The local elevation angle change due to the relative curvature of the reference sphere is determined in relation to a curvature model comprised of a curvature term selected in relation to current atmospheric conditions and in vertically dependent relation to a multiple of predetermined altitude zones. The altitude of the propagation path is determined by the sum of the altitude of the transmitting antenna and the discrete changes in the product of incremental range changes and the sine function of the local elevation angle, accumulated over the range of the propagation path. The local elevation angle is derived from the sum of the antenna elevation angle plus the discrete changes in the elevation angle of the propagation path accumulated over the range of the propagation path. This method provides a real-time determination of the altitude of the signal propagation path whether the signal is launched at a positive or negative elevation angle. Since the atmospheric refractive index gradient is not significantly different from its sea level value at altitudes below sea level, the wet and dry terms of the atmospheric model may be selected in relation to a sea level signal altitude for altitudes below sea level.

BRIEF DESCRIPTION OF THE DRAWINGS

FIG. 7 is a nomograph for determining the setting of the wet propagation model switch of FIG. 5.

DESCRIPTION OF THE PREFERRED EMBODIMENT

The disclosed method and apparatus for determining the altitude of the propagation path of a transmitted signal are based on a geometrically precise development of the effects of the deviation of the propagation speed from the speed of light in a vacuum, the curvature of the earth, and the atmospheric refractive index gradient, on the propagation path of an electromagnetic signal.

Figure 1:
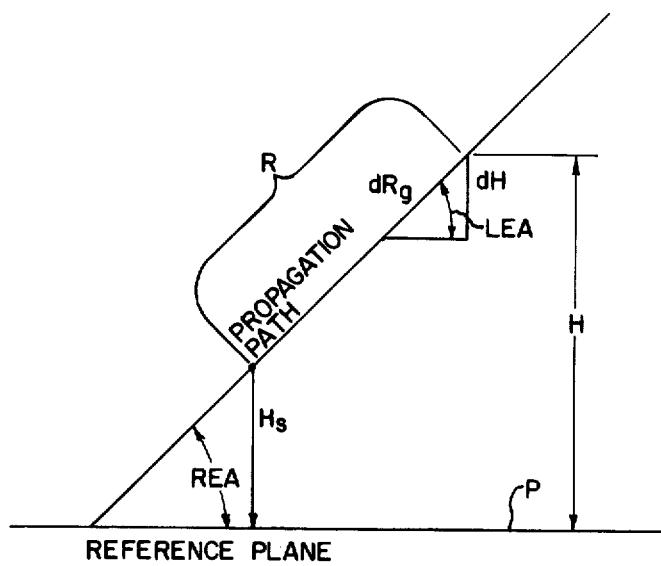
FIG. 1 is a geometric representation of the path of a signal propagated through an atmosphere of constant refractive index relative to a planar reference surface.

FIG. 1 represents a signal propagation path in relation to a flat reference plane P covered by a homogeneous atmosphere of constant index of refraction $n_o$. Because the atmospheric refractive index gradient is zero there is no curvature in the propagation path relative to the planar reference surface. Since the reference surface is planar and the propagation paths are straight lines, a transmitted signal maintains a constant localized elevation angle (LEA) with respect to the reference surface which is equal to the transmission elevation angle (REA).

FIG. 1 shows that the altitude of the propagation path H can be determined at any point along the path by accumulating incremental changes in altitude dH from the point of transmission to that point. This may be mathematically expressed as:

$$H = H_t + \int_{H_t}^{H} dh \qquad (4)$$

The sine function of the local elevation angle of the propagation path, sine (LEA), is equal to the incremental change in height dH divided by the incremental change in geometrical range $dR_g$.

$$\text{sine } (LEA) = \frac{dH}{dR_g} \qquad (5)$$

Signal range R, is determined by multiplying an echo time delay by the speed of light in a vacuum (c). However, the atmospheric propagation speed is different from that of an identical signal traveling in a vacuum. In a medium with an index of refraction n, the true velocity of propagation is (c/n), so that the determined signal range incremental change, dR, is related to the actual geometrical distance increment, $dR_g$, according to the equation:

$$dR_g = \frac{dR}{n} \qquad (6)$$

The incremental geometrical range $dR_g$ and the incremental altitude dH form the hypotenuse and vertical side of a right triangle. Substituting for $dR_g$ from equal (6), sine (LEA) can be expressed as:

$$n\frac{dH}{dR} = \sin (LEA) \qquad (7)$$

Substituting equation (7) in equation (4) and integrating over the propagation range results in:

$$H = H_t + \int_0^R (1/n) \sin (LEA) \, dr \qquad (8)$$

For the case shown in FIG. 1 having a flat reference plane and a straight line propagation path, LEA equals REA and the altitude of the propagation path (H) may be expressed by the equation:

$$H = H_t + (1/n) \int_0^R \sin (REA) \, dr \qquad (9)$$

Figure 2:
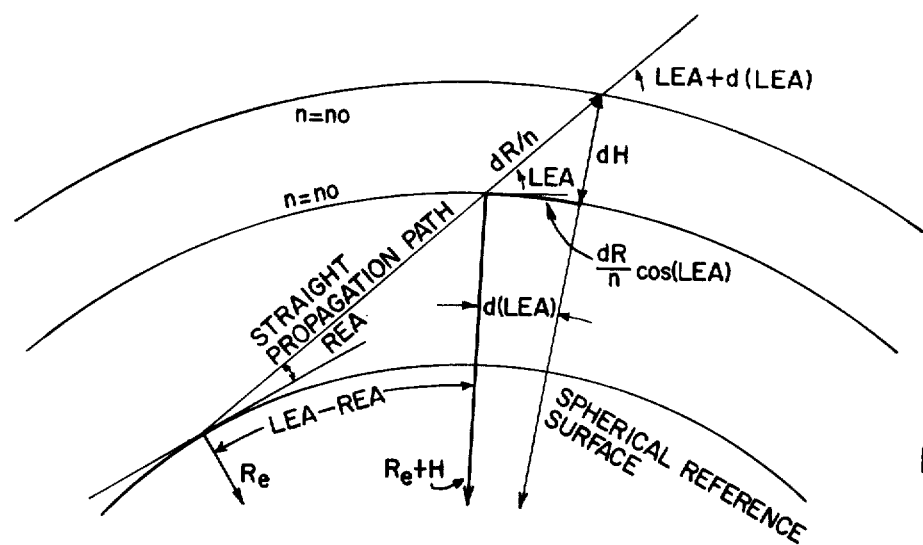
FIG. 2 is a geometric representation of the path of a signal propagated through an atmosphere of constant refractive index relative to a spherical reference surface.

FIG. 2 represents a spherical reference surface having a radius of curvature $R_e$ and surrounded by a homogeneous atmosphere of constant index, n. Again there is no propagation path curvature but the local elevation angle LEA changes with range R because it is measured between the line of propagation and $R_e$ + H, the radius of curvature of a sphere concentric with the reference sphere and intersecting the propagation path at altitude H. The rate of change of local elevation angle with range, d(LEA)/dR, due to the reference surface curvature is:

$$\left[\frac{d(LEA)}{dR}\right]_1 = \frac{\cos (LEA)}{n(R_e + H)} \qquad (10)$$

The factor $n$ again converts a signal range increment $dR$ to a true distance increment $dR_r$. The factor $\cos(LEA)$ arises because the range increment is projected onto the local tangent to the sphere of radius $(R_e+H)$. Equation (10) is also applicable when the index of refraction is a function of altitude H.

Figure 3:
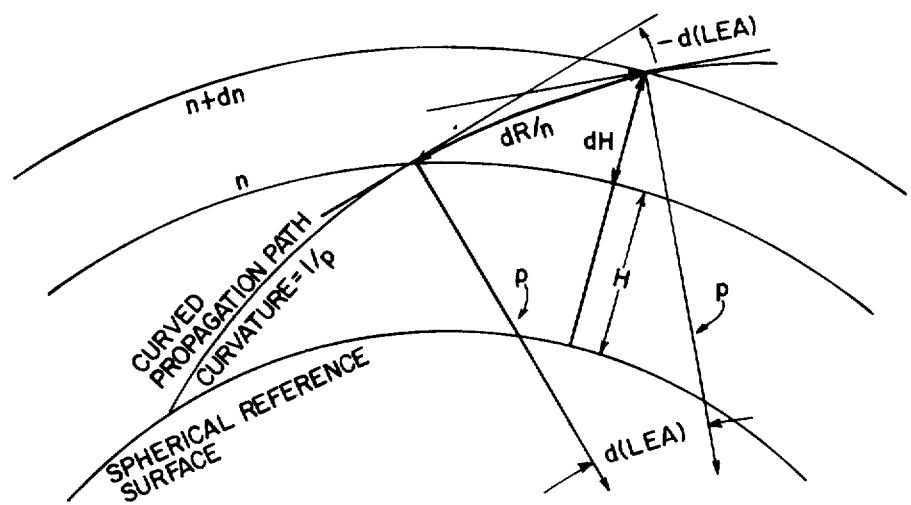
FIG. 3 is a geometric representation of the path of a signal propagated through an atmosphere with a refractive index gradient relative to a spherical reference.

FIG. 3 represents a spherical reference surface surrounded by an atmosphere having a non-homogeneous refractive index. Since the index is varying, the rays are no longer straight lines and there is a second contribution to the rate of change of local elevation angle LEA with range R which is due to the curvature of the propagation path itself. This may be expressed by:

$$\left[ \frac{d(LEA)}{dR} \right]_2 = -\frac{1}{np} \quad (11)$$

Here, $p$ is the radius of curvature of the propagation path caused by the gradient in the index of refraction. The factor $n$ again occurs to convert the signal range increment $dR$ to a true distance increment $dR_r$. There is no cosine factor because the range increment lies on the curved propagation path itself. The minus sign indicates that the elevation angle decreases as the ray bends toward the earth, a condition for which $p$ is positive.

The propagation path of a signal traveling through an atmosphere having a vertical index gradient relative to a spherical reference surface may be derived from Snell's law. For a horizontally stratified atmosphere over a spherical reference, the radius of curvature of the propagation path can be expressed in terms of the gradient of the refractive index $dn/dH$ and the local elevation angle LEA as:

$$\frac{1}{p} = \frac{-1}{n} \frac{dn}{dH} \cos(LEA) \quad (12)$$

The $\cos(LEA)$ factor arises because the curvature of the propagation path, $(1/p)$, is proportional to that component of the vertical gradient which is normal to the propagation path. When the index decreases with height, which is normally the case $(dn/dH)$ is negative and $(1/p)$ is positive.

Figure 4:
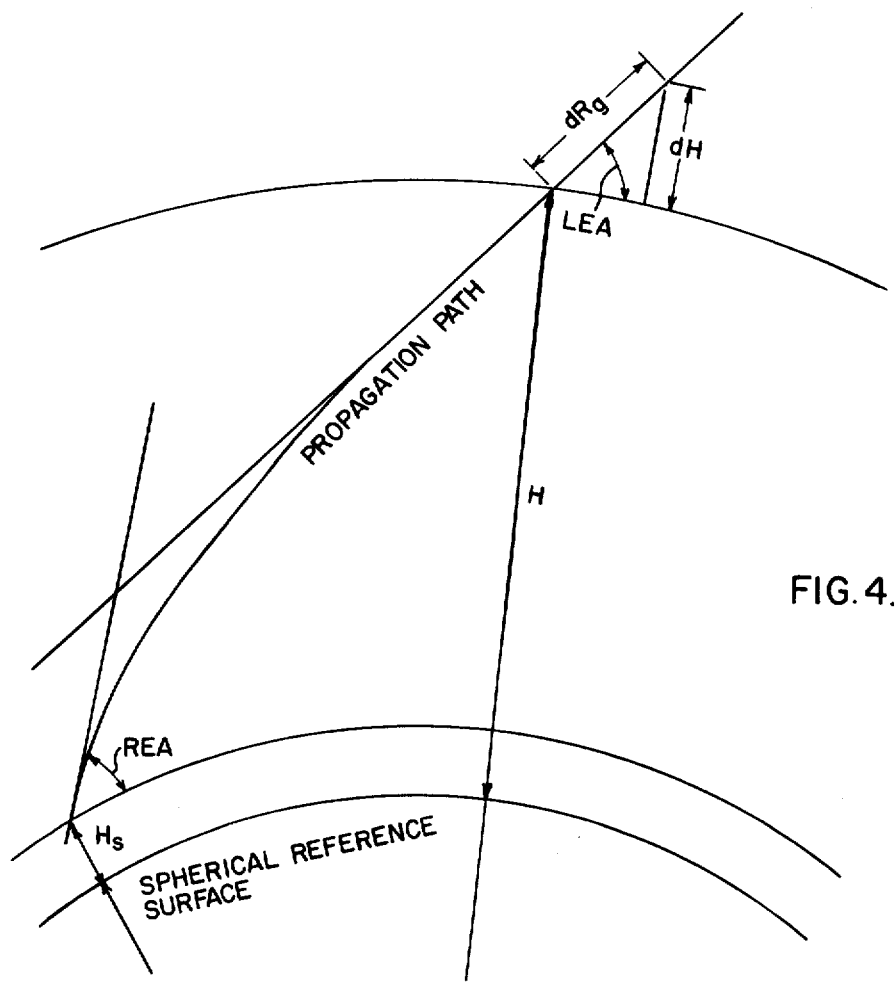
FIG. 4 is a geometric representation of the disclosed method for determining the propagation path of a signal transmitted through an atmosphere with a refractive index gradient, relative to a spherical reference surface.

FIG. 4 shows a modification of the method of determining the altitude of a linear propagation path relative to a reference plane explained in relation to FIG. 1 and equation (9) to account for the effects of reference surface curvature and a vertical refractive index gradient described in relation to FIGS. 2 and 3 and equations (10), (11) and (12).

At the time the signal is transmitted, range R is zero and the initial value of the local elevation angle of propagation is the transmitting antenna elevation angle, REA. At other ranges, LEA is given by the sum of REA and the integral of the local changes in elevation angle LEA due to reference surface curvature and propagation path curvature. From equations (10), (11) and (12) this may be expressed mathematically as:

$$LEA = REA + \int_0^R (1/n) \cos(LEA) \left[ \frac{1}{(R_e+H)} + \frac{1}{n} \frac{dn}{dH} \right] dx \quad (13)$$

The variables LEA, H, $n$ and $dn/dH$ in the integrand are implicit functions of the running variable of integration, radar range, R. Using Snell's law, the factor $\cos(LEA)$ in the integrand can be replaced by:

$$\cos(LEA) = \frac{n_s(R_e+H_s)\cos(REA)}{n(R_e+H)} \quad (14)$$

where $H_s$ represents the altitude, relative to the reference sphere, at which the signal is launched and $n_s$ represents the refractive index at the altitude $H_s$. From equations (13) and (14).

$$LEA = REA + \int_0^R \frac{n_s(R_e+H_s)\cos(REA)}{n^2(R_e+H)} \left[ \frac{1}{(R_e+H)} + \frac{1}{n} \frac{dn}{dH} \right] dx \quad (15)$$

Combining equations (8) and (15) gives $$H = H_s + \int_0^R [1/n(r)] \sin\left[ REA + \int_0^r G_e(x)dx \right] dr \quad (16)$$

where $$G_e = \frac{n_s(R_e+H_s)\cos(REA)}{n^2(R_e+H)} \left[ \frac{1}{(R_e+H)} + \frac{1}{n} \frac{dn}{dH} \right] \quad (17)$$

Equation (16) shows that the altitude of the propagation path is equal to the sum of the altitude of the point of transmission plus the range integral of a sine function whose argument is the sum of REA, the transmitting antenna elevation angle plus $$\int_0^r G_e(x)dx,$$

the range integral of the change in local elevation angle. From a comparison of equations (9) and (16), it is evident that the term $$\left( \int_0^r G_e(x)dx \right)$$

in the argument of the sine function of equation (16) accounts for the effects of the reference surface curvature and the refractive index gradient on the local elevation angle.

The disclosed method for the real-time determination of the altitude of the propagation path of a transmitted signal is illustrated in FIG. 4. Equation (8) shows that, by neglecting the difference in velocity between signals propagated through the atmosphere and signals propagated in a vacuum, the altitude (H) of the propagation path may be determined by adding the altitude of the transmission antenna ($H_S$) to the sine function of the signal local angle of elevation [sine(LEA)] integrated over the range (R) of the propagation path. This may be expressed mathematically by:

$$H = H_s + \int_0^R \sin(LEA) \, dr \quad (18)$$

where
R is the range of the propagation path;
H is the altitude of the propagation path with respect to the reference sphere at range R;
$H_S$ is the altitude of the signal transmission antenna; and
LEA is the local elevation angle.

Again neglecting the difference in velocity between signals propagated through the atmosphere and signals propagated in a vacuum, equation (15) suggests that the local elevation angle is comprised of the sum of the antenna elevation angle and the range integral of the change in local elevation angle due to the curvature of the reference surface and the atmospheric refractive index gradient. The disclosed method assumes that the change in local elevation angle is a function of altitude only. This can be expressed as:

$$LEA = REA + \int_0^r G(H) \, dx \quad (19)$$

where
REA is the radar antenna elevation angle; and
G(H) is the change in elevation angle as a function of altitude.

The explicit dependence of G(H) is on altitude, rather than on range, because, in the implementation of this method, the values of G(H) are established in relation to atmospheric and curvature models which have height as the independent variable. The integration of G(H) produces the change in local elevation angle caused by the curvature in the radar propagation path due to the vertical atmospheric refractive index gradient and the curvature of the spherical reference surface. Inclusion of the vertical dependence of the refractive index in the altitude processing method reduces errors by an order of magnitude.

Combining equations (18) and (19) shows that the disclosed method determines height according to the equation:

$$H = H_s + \int_0^R \sin\left[REA + \int_0^r G(H) \, dx\right] dr \quad (20)$$

Equation (20), representing the disclosed method of determining the altitude of the propagation path of a signal, differs from equation (16), representing a precise, geometric derivation of the altitude, by a factor of $(1/n)$ which multiplies the sine function in equation (16) but does not appear in equation (20). $(1/n)$ is not included in the disclosed method because its implementation would require an additional multiplier in the processor apparatus. The effect of neglecting the factor $(1/n)$, as does equation (20), is negligible. The value of $n$ is typically 1.0003 at sea level and eventually decreases toward unity as altitude increases. In fact, $n$ is about 1.0001 at only 30,000 feet. To get a upper bound on the error involved in neglecting $(1/n)$, as does equation (20), suppose the extreme value 1.0005 extends from sea level to 30,000 feet and drops to 1.0001 above 30,000 feet. When the contribution of the integral in equation (16) is 100,000 feet, the same integral without the factor $(1/n)$ would be 100,022 feet. This error of 22 feet at 100,000 feet is an upper bound; the actual error is less because $n$ approaches unity uniformly as height increases. Equation (20) also differs from equation (16) because the functional form of G(H) in equation (20) need not be exactly the same as $G_e(x)$ in equation (16). It will now be shown that the functional form of G(H) can be selected to correct for neglecting the factor $(1/n)$. If equation (20) is differentiated twice with respect to range according to Leibnitz's rule for integrals, $$G = (d^2H/dR^2) / \sqrt{1-(dH/dR)^2} \quad (21)$$

In equation (7), the slope of the propagation path was shown to be:

$$dH/dR = \sin(LEA)/n = \sqrt{1-X^2/n} \quad (22)$$

where X represents cos(LEA). Using Snell's law, X can be expressed as a function of height as:

$$X = \cos(LEA) = \frac{n_s(R_e + H_s)}{n(R_e + H)} \cos(REA) \quad (23)$$

where the index $n$ is assumed to be a function of height only, representing a horizontally stratified atmosphere.

From equation (22), it can be shown that $$\frac{d^2H}{dR^2} = \frac{(2X^2 - 1)}{n^3} \frac{dn}{dH} + \frac{X^2}{n^2(R_E + H)} \quad (24)$$

Combining this with equation (21) leads to the following expression for the propagation curvature term, G(H).

$$G(H) = \frac{(2X^2 - 1)}{n^2\sqrt{X^2 + n^2 - 1}} \frac{dn}{dH} + \frac{X^2}{n\sqrt{X^2 + n^2 - 1}(R_e + H)} = G_1 + G_2 \quad (25)$$

This functional form for G(H) corrects for the absence of the factor $(1/n)$ in equation (20).

From equation (17) $G_e$ can be rewritten as:

$$G_e = \frac{X}{n^2} \frac{dn}{dH} + \frac{X}{n(R_e + H)} = G_{e1} + G_{e2} \quad (26)$$

Equations (25) and (26) show that both G and $G_e$ contain factors proportional to $n^{1/6}$ $^2(dn/dH)$, which expresses the change in local elevation angle due to the refractive index gradient, and $n^{1/6}$ $^1(R_e+H)^{-1}$, which expresses the change in the local elevation angle due to the curvature of the spherical reference surface. The ratio of the pair of factors representing the reference curvature effect is:

$$G_2/G_{e2} = X/\sqrt{X^2 + n^2 - 1} \approx 1 - (n-1)/\cos^2(REA) \quad (27)$$

Since $(n-1)$ never exceeds $5\times 10^{-4}$ and $\cos^2(REA)$ is only ¾ at 30° elevation, these factors agree to better than 7 parts in 10,000.

The ratio of the pair of factors representing the refractive index gradient effect is:

$$\frac{G_1}{G_{e1}} = \frac{(2X^2 - 1)}{X\sqrt{X^2 + n^2 - 1}} \simeq [1 - \tan^2(REA)][1 - (n - 1)/\cos^2(REA)] \quad (28)$$

At 0° elevation, these factors agree to better than 5 parts in 10,000. However, their ratio deviates from unity progressively as REA increases. At 30° elevation, their ratio is about (⅞). This effect is limited, however, since for the larger antenna elevation angles, the signal quickly gets to an altitude where the refractive index effect becomes negligible.

The method of determining the altitude of a signal propagation path according to equation (20) includes establishing $G_2$, the change in local elevation angle due to the curvature of the reference sphere, in vertically dependent relation to a curvature model; and establishing $G_1$, the change in local elevation angle due to the atmospheric refractive index gradient, in vertically dependent relation to an atmospheric model.

Where sufficient refractive index data has been collected, as from radiosonde measurements, this may be used directly to determine the value of the propagation curvature function $G(H)$ according to equation (25). These values may then be vertically indexed as, for example, in read-only-memories or a properly programmed computer, to provide the necessary curvature and atmospheric models. Since the refractive index is dependent on atmospheric temperature and pressure and the partial pressure of water vapor, the atmospheric model should be adaptable to variations in these atmospheric conditions.

Where empirically measured index data is unavailable, the change in local elevation angle caused by the refractive index gradient and the reference surface curvature can be determined according to modeling equations. Physical theory for the refractive index of dilute gases predicts that the index behavior of a standard air sample may be approximated by:

$$\frac{dN}{dH} = \frac{77.6d\,(P/T)}{dH} + \frac{373000d\,(e/T^2)}{dH} \quad (29)$$

where:
P is atmospheric pressure;
T is absolute temperature; and
$e$ is the partial pressure of water vapor. The term $$\frac{77.6d\,(P/T)}{dH}$$

is generally referred to as the "dry term" and the term $$\frac{373000d\,(e/T^2)}{dH}$$

is generally referred to as the "wet term".

Equation (29) shows that, for the behavior of dN/dH, one must know the dependence of (P/T) and (e/T²) on altitude. From data collected on a world-wide basis, a general exponential height dependence has been found for both (P/T) and (e/T²). This world-wide index data has been used to determine parameters of the following equations for modeling the vertical index structure. These modeling equations are:

$$N(H) = D_o e^{-H/H_D} + W_o e^{-H/H_W}, \quad H \leq H_t \quad (30)$$
$$N(H) = D_t e^{-(H-H_T)/H_S} + W_o e^{-H/H_W}, \quad H > H_t \quad (31)$$

where:
$e = 2.718281828...$
$D_o = 77.6\,(P_o/T_o)$: the dry term N-value at sea-level;
$W_o = 373000(e_o/T_o^2)$: the wet term N-value at sea-level;
$H_d$ represents the dry term scale height in the troposphere at which the dry term is decreased to $(1/e)$ of its surface value;
$H_s$ represents the dry term scale height in the stratosphere at which the dry term is decreased to $(1/e)$ of its reference value at the tropopause;
$H_w$ represents the wet term scale height at which the wet term is decreased to $(1/e)$ of its surface value;
$H_t$ represents the height of the tropopause which separates the troposphere and stratosphere; and
$D_t = D_o e^{-H_T/H_D}$ The term N-unit used above, expresses the deviation of the refractive index from unity, multiplied by one million. For example, an index of 1.000313 would have an N-value of 313 N-units. If the index decreased from 1.000313 to 1.000293 with an increase in altitude of one kilometer, the vertical gradient would be −20 N-units/km.

Equations (30) and (31) show that there are actually two dry term scale heights - one for the troposphere and another for the stratosphere. The reason for this is that the temperature decreases with height in the troposphere while it increases slightly with height in the stratosphere.

There are certain areas of the world where, during at least one or two months of the year, the refractive index gradient departs markedly from the exponential model of equations (30) and (31). Therefore, these model equations are not universally applicable. When there is water vapor input to the lowest air level, as by evaporation from oceans, the local gradient of water vapor would be greater than in long term averaged conditions. In a truly dynamic evaporation-condensation situation, such as occurs in the tropics, the exponential models may be grossly inaccurate. In such regions no simple model with one or two parameters can be expected to apply and the values of the refractive index must be experimentally determined.

Since atmospheric conditions vary during the day as well as seasonally, provisions must be made to vary the atmospheric model based on measured atmospheric parameters. The effect of temporal variations at a coastal tropical or sub-tropical location are particularly dramatic. Changing the atmospheric model several times a day to "track" the diurnal index cycle is mandatory. A "daytime" model and a "nighttime" model with one or two transitional models for the periods after both sunrise and sunset may become necessary. Additional changes should accompany the passage of weather fronts.

At coastal locations there will be times when substantial horizontal index variations will occur. If the atmospheric model presents an accurate representation in one azimuth, it will be in error at another. Unless two models are provided, the atmospheric model can represent either the landward or the seaward sector.

The two terms $G_1$ and $G_2$ in equation (25) comprising the apparatus curvature term, $G(H)$, have widely different height dependence. This may be illustrated by making the following approximations:

$$(R_e + H) \simeq (R_e + H_s) \simeq R_e; \; n \simeq n_s \simeq 1; \; X \simeq \cos(REA) \quad (32)$$

which permits equation (25) to be reduced to:

$$G(H) \simeq \frac{\cos(2REA)}{\cos(REA)} \cdot \frac{dn}{dH} + \frac{\cos(REA)}{R_e} \quad (33)$$

Assuming the atmospheric modeling equations (30) and (31) are applicable, the change in the index of refraction with respect to height (dn/dH) is the sum of two functions which decrease exponentially with height - the "dry term"

$$\frac{77.6 d \, (P/T)}{dH}$$

and the "wet term"

$$\frac{373000 d \, (e/T^2)}{dH}.$$

The first term in equation (25) therefore has a strong height dependence, while the second term is nearly independent of height.

As explained earlier, although $G_{e1}$ and $G_{e2}$ have a dependence on the antenna elevation angle (REA), the disclosed method is to establish the change in local elevation angle only as a function of altitude G(H). Values of G(H) are determined in relation to a finite number of altitude zones and the appropriate value is employed as the signal crosses the respective altitude zone. Still assuming the applicability of equations (30) and (31), the exponential height dependence of (dn/dH) makes it desirable to establish a non-uniform set of altitude zones. Because (dn/dH) changes most rapidly near the surface, the altitude zones are narrowest at low altitudes. The most rapid change in (dn/dH) is due to the wet term, with a typical scale height $H_w$ of about 8,200 feet so that the lowest altitude zones should be significantly narrower than this.

To determine the errors introduced by representing G(H) as constants in a set of altitude zones, the sine function of equation (20) is expanded as follows:

$$H = H_s + \sin(REA) \left\{ {}_0\!\int^R \cos\left[ {}_0\!\int^r G dx \right] dr \right\} +$$

$$\cos(REA) \left\{ {}_0\!\int^R \sin\left[ {}_0\!\int^r G dx \right] dr \right\} \quad (34)$$

The largest magnitudes that G can assume correspond to severe subrefraction and severe ducting. For severe subrefraction, the propagation path curves upward with a curvature approximately equal (but opposite in sign) to that of the earth due to an increase of $n$ with H at low altitudes. For severe ducting, the path curves downward with a curvature approximately three times as large as that of the earth due to a rapid decrease of $n$ with H at low altitudes. In both cases the largest magnitude of G is twice the curvature of the earth.

$$G_{max} \simeq 2\cos(REA)/R_e; \; \text{severe subrefraction} \quad (35)$$
$$G_{min} \simeq -2\cos(REA)/R_e; \; \text{severe ducting} \quad (36)$$
$$G_{typical} \simeq 1.67 \cos(REA)/(4R_e); \; 4/3\text{-earth radius case} \quad (37)$$

The curvature of the earth is approximately equivalent to a vertical index gradient of 157 N-units/km. For small antenna elevation angles, the magnitude of $G_{max}$ and of $G_{min}$ is about $10^{-7} \, \text{ft}^{-1}$.

The largest vertical N gradient is associated with the severe ducting case (equation 36). Between them, wet and dry terms must add up to 3 times 157 N-units/km, since the effect of the earth, 157 N-units/km, is subtracted in the case of ducting. A typical tropical dry term is 27 N-units/km. This requires an extreme wet term of 444 N-units/km at the surface. For a 8200 feet wet term scale height, this wet contribution drops by a factor of 0.8227 (to 365 N-units/km) at 1600 feet, the top of the first zone. The average of these values at the top and bottom of the first zone is 405 N-units/km. This differs from the extreme values (at the ends of the zone) by only 1 part in 10. The vertical N-gradients, for the model atmospheres, are greatest in the first (lowest) zone. Therefore, the accuracy of a stored G(H) value will be better in zones 2, 3, and 4 than in the 1st zone. The width of the 5th zone, may be twice that of zones 1-4, but due to the exponential decrease with an 8200 feet scale height, the accuracy of G(H) is still better than in either the 1st or 2nd zone.

The discussion above was in terms of maximum errors in an altitude zone. The stored G(H) value is between the values at each end of the zone so that part of the error is averaged out as the integration of G(H) proceeds across the zone.

The condition for correct change in the local angle of elevation across a height zone is that $$I = \int_{R_n}^{R_{n+1}} G(H) \, dr = (R_{n+1} - R_n) G(H_n'); \; H_{n+1} > H_n' > H_n \quad (38)$$

where
$R_{n+1}$ represents the range at altitude $H_{n+1}$
$R_n$ represents the range at altitude $H_n$
$H_{n+1}$ represents the top of the altitude zone
$H_n$ represents the bottom of the altitude zone
$H_n'$ represents a point in the altitude zone where G(H) is actually elevated for storage.

From equations (22) and (25) it can be shown that:

$$G(h)(dR/dH) \simeq \frac{\cos(2REA)}{\sin(LEA)\cos(REA)} \cdot \frac{dn}{dH} + \frac{\cos(REA)}{\sin(LEA) R_e} \quad (39)$$

The range difference between the top and bottom of the height zone is approximately:

$$R_{n+1} - R_n \simeq (H_{n+1} - H_n)/\sin(LEA) \quad (40)$$

Assuming sin(LEA) is constant across the altitude zones, equations (39) and (40) can be used to evaluate the integral in equation (38) which results in:

$$I = \frac{\cos(2REA)}{\sin(LEA)\cos(REA)} \cdot (n_{n+1} - n_n) + \frac{\cos(REA)}{R_e \sin(LEA)} \cdot (H_{n+1} - H_n) \quad (41)$$

The two values of the index, $n_{n+1}$ and $n_n$, correspond to the top and bottom of the zone, respectively. Comparing equation (38) and equation (41) it can be seen that:

$$G(H_n') = \frac{\cos(2REA)}{\cos(REA)} \cdot \frac{(n_{n+1} - n_n)}{(H_{n+1} - H_n)} + \frac{\cos(REA)}{R_e} \quad (42)$$

Since the changes in local elevation angle are assumed to be only a function of altitude according to the disclosed method, the dependence on REA is not implemented and the stored values of the G-function in the $n^{th}$ zone may be determined by:

$$G_n = \frac{\cos(2\theta_o)}{\cos(\theta_o)} \cdot \frac{\Delta N_n}{\Delta H_n} \times 10^{-6} + \frac{\cos(\theta_o)}{R_e} \quad (43)$$

where $\theta_o$ represents a typical low elevation angle of the antenna, chosen to balance the angle dependence.
$R_e$ represents the radius of the earth at sea-level.
$\Delta H_n$ represents the width of the $n^{th}$ height zone, ($H_n - H_{n-1}$).
$\Delta N_n$ represents the difference in index between the top and bottom of the $n^{th}$ height zone in N-units.

The value of $G_n$ calculated from equation (43) differs by a negligible amount from the value obtained if the G-function is merely evaluated at the midpoint of the height interval. For a worst case example, consider the extreme wet term of 444 N-units/km at sea level discussed earlier. The value of (dN/dH) at 800 feet, the middle of the first zone, is 402.7 N-units/km. The value ($\Delta N/\Delta H$) appearing in equation (43) is 403.4 N-units/km. The difference (0.7 N-units/km) is less than 1 part in 500.

For comparison, the encoded value of the antenna elevation angle can be related to this error in vertical gradient. Assume that the least significant bit of the antenna elevation angle is $1.92 \times 10^{-4}$ radians. Since the radius of curvature of the earth corresponds to 157 N-units/km. 1 N-unit/km is equivalent to an angle rate of $3.05 \times 10^{-10}$ radians/foot. The range at which a fixed error of 0.7 N-unit/km would show an accumulated angle error equivalent to 1 least significant bit of elevation is 900,000 feet.

A further comparison can be had by integrating from the bottom to the top of the first zone using an effective G(H) value in error by 1 part in 500. Since the correct value would have given the width of the zone (1600 feet), the error would be about 3 feet. It should be remembered that such errors are for an extreme atmosphere (severe ducting), in the lowest altitude zone where the error is largest so that there is substantial probability that the error will be less.

Figure 5:
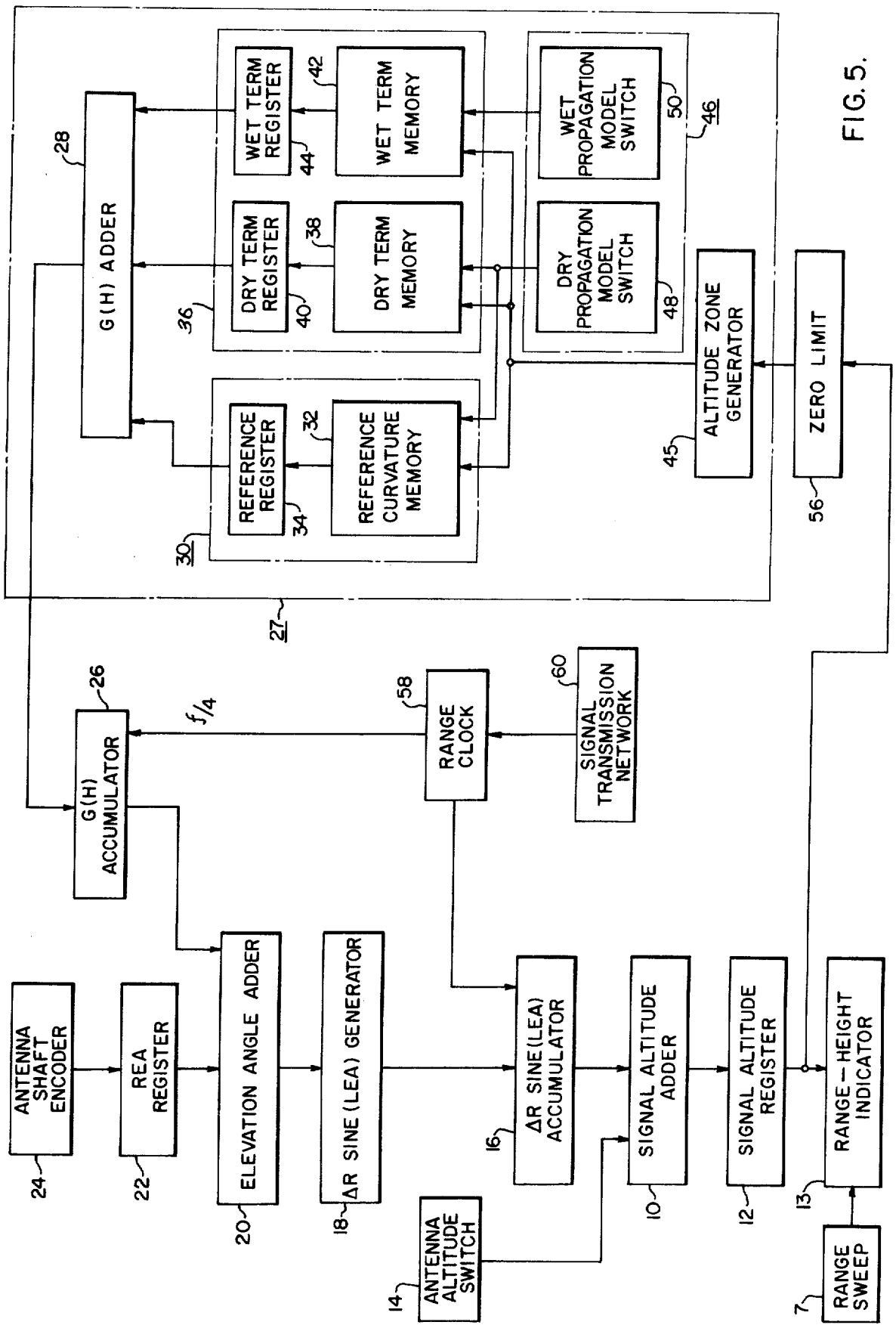
FIG. 5 is a block diagram of the disclosed apparatus for determining the propagation path of a signal transmitted through an atmosphere with a refractive index gradient, relative to a spherical reference surface.

FIG. 5 shows a block diagram of the preferred embodiment of the disclosed signal processor for determining the altitude of the propagation path of a signal transmitted from an antenna in accordance with equation (20). The altitude (H) of the signal path relative to a reference sphere, which is chosen as sea level, is determined in signal altitude adder 10. Signal altitude adder 10 determines the sum of ($H_s$), the antenna altitude above sea level, plus $$\int_0^R \sin(LEA)$$

the sine function of the local elevation angle integrated over the range of the signal path. The altitude determined by signal altitude adder 10 is transferred to signal altitude register 12, whose output provides a useful altitude signal and also serves as a feedback signal for determining the local elevation angle (LEA) as will be explained later.

In the preferred embodiment, the output of signal altitude register 12 is used in cooperation with a range sweep 7 to drive a real time, range-height indicator 13 in which the range sweep drives the horizontal deflection and the altitude register 12 output drives the vertical deflection of a cathode ray tube beam. The cathode ray tube beam may also be intensity modulated to provide a visual indication of a detected object. The output signal of register 12 could, alternatively, be used for other purposes.

The $H_s$ input to signal altitude adder 10 is determined according to the operator setting of antenna altitude switch 14, and the $$\int_0^R \sin(LEA)$$

input is determined, in discrete form, by $\Delta$ R sine(LEA) accumulator 16.

$\Delta$ R sine(LEA) accumulator 16 maintains a running sum of the altitude increments at range R of $\Delta$ R sine(LEA) generator 18 which may be comprised of a National Semiconductor SK0003 Sine/Cosine Look-Up Table Kit or equivalent device. $\Delta$ R sine(LEA) generator 18 determines altitude increments in relation to the product of a predetermined range increment $\Delta$ R and the sine function of LEA which is established in elevation angle adder 20, according to equation (19), by adding REA, the antenna elevation angle, and $$\int_0^r G(H)\, dx,$$

the change in the local elevation angle integrated over the range of the propagation path.

REA is provided to elevation angle adder 20 from REA register 22 which is controlled by antenna shaft encoder 24. Antenna shaft encoder 24 digitally encodes the elevation angle of the signal transmitting antenna which may be comprised of a nodding beam, step scan, or monopulse antenna. In the preferred embodiment, the digital word representing REA has a least significant bit of 45/4,096 degrees.

$$\int_0^r G(H)\, dx$$

is provided to elevation angle adder 20 by G(H) accumulator 26 which maintains a running addition of G(H), the change in local elevation angle, over the range of the signal path.

G(H) is determined according to equation (25) by local elevation angle model 27 which includes G(H) adder 28; curvature model 30; refractive index gradient model 36; altitude zone generator 45, and atmospheric model 46. G(H) adder 28 determines the sum of $G_2$, the change of the local elevation angle due to the curvature of the sea level reference sphere, plus $G_1$, the change of the local elevation angle due to the atmospheric refractive index gradient. $G_2$ is determined in relation to a curvature model 30 comprised of a reference curvature memory 32 and a reference register 34. $G_1$ is determined in relation to a refractive index gradient model 36 comprised of a dry term memory 38 which controls a dry term register 40, and a wet term memory 42 which controls a wet term register 44. Since the change in local elevation angle due to $G_1$ and $G_2$ depends on atmospheric conditions which vary as a function of altitude and time, the values stored in reference curvature memory 32, dry term memory 38, and wet term memory 42, which may be comprised of read only memories, are indexed in relation to an altitude zone generator 45 and an atmospheric model 46.

In the preferred embodiment, reference curvature memory 32 and dry term memory 38 are comprised of read-only-memories having twelve vertical addresses and, for each vertical address, ten horizontal addresses. Wet term memory 42 is comprised of a read-only-memory having eight vertical addresses and, for each vertical address, 64 horizontal addresses. When refractive index data more precise than model equations (30) and (31) is available, the memories 32, 38 and 42 may be comprised of more extensive read-only-memories. These more extensive memory elements would be especially useful in locations subject to extreme perturbations of the vertical component of the refractive index gradient.

If the atmospheric refractive index gradient has been experimentally determined in relation to altitude and atmospheric conditions, refractive index gradient model 36 could be comprised of a single read-only-memory containing this data controlling a single register in relation to altitude zone generator 45 and atmospheric model 46. However, due to the general unavailability of experimentally determined refractive index data, the preferred embodiment of refractive index gradient model 36 implements modeling equations (30) and (31) to establish $G_1$ in relation to dry term memory 38 and wet term memory 42. Dry term memory 38 establishes $G_1$ in relation to $D_o e^{-H/H_D}$ and $D_t e^{-(H-H_T)/H_S}$ of equations (30) and (31) respectively and wet term memory 42 establishes $G_1$ in relation to $W_o e^{-H/H_W}$ of equations (30) and (31). Since $D_o$ and $D_t$ of equations (30) and (31) are dependent upon atmospheric pressure and temperature, and since $W_o$ of equations (30) and (31) is dependent on the partial pressure of water vapor and atmospheric temperature, the preferred embodiment of atmospheric model 46 is comprised of a dry propagation model switch 48, which is representative of the dynamic atmospheric temperature and pressure conditions, and a wet propagation model switch 50, which is representative of the dynamic atmospheric temperature and partial pressure of water vapor conditions. Dry propagation switch 48 is operative with reference curvature memory 32 and dry term memory 38, and wet propagation model switch 50 is operative with wet term memory 42. Due to the disparate altitude dependencies of $G_1$ and $G_2$ which was described in relation to equation (33), dry propagation model switch 48 can be much smaller than wet propagation model switch 50 without a sacrificing accuracy in the determination of G(H).

Since atmospheric conditions vary during the day as well as seasonally, provisions are included to discretely vary switches 48 and 50 of atmospheric model 46 based on measured parameters of atmospheric temperature, atmospheric pressure, and the partial pressure of water vapor. Reference curvature memory 32, dry term memory 38, and wet term memory 42 are indexed such that the vertical gradient of the index, evaluated at sea level, changes by 2.5 N-units/km when either the dry switch 48 or the wet switch 50 is changed by one unit. This condition means that the successive atmospheric conditions represented in the values of memories 32, 38 and 42 have index gradients differing by 2.5 N-units/km at sea level. This granularity is sufficient to make the altitudes computed from adjacent pairs of the stored atmospheres accurate to within 340 feet at 150 nm range. This altitude granularity at 150 nm is commensurate with the accuracy of the antenna elevation angle provided by the antenna encoder 24.

In the preferred embodiment, switch 50 is comprised of two perpendicularly arranged, eight-position selector switches providing 64 selections and switch 48 is comprised of a ten-position selector switch. Together switches 48 and 50 provide 640 different combinations of values for atmospheric model 46.

Figure 6:
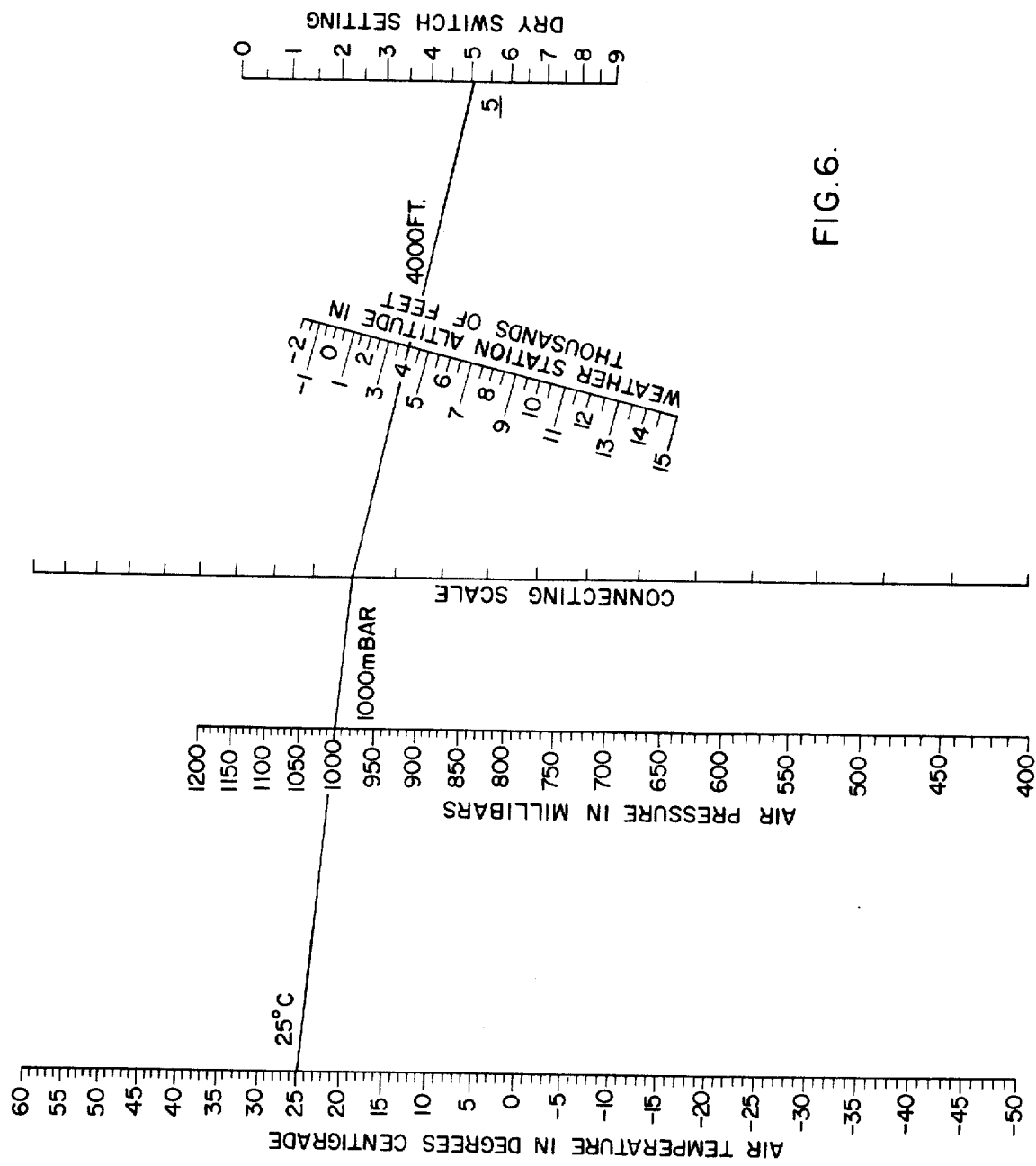
FIG. 6 is a nomograph for determining the setting of the dry propagation model switch of FIG. 5.

In the preferred embodiment, dry propagation model switch 48 is a ten-position selector switch whose setting is selected from atmospheric temperature and pressure measurements plotted on the nomograph of FIG. 6. Dry propagation model switch 48 may, therefore, be reset as often as current temperature and pressure measurements become available. Wet propagation model switch 50 is comprised of two perpendicularly disposed, eight-position selector switches which provide an array of 64 possible selections. The wet propagation model switch setting is selected from relative humidity and atmospheric temperature measurements plotted on the nomograph of FIG. 7. Wet propagation model switch 50 may, therefore, be reset as often as current temperature and relative humidity readings become available. Although the precise nomographs of FIGS. 6 and 7 are based on the approximation that the atmosphere can be represented by the model equations (30) and (31), the use of nomographs to determine the wet and dry switch settings is generally applicable. The nomographs will change depending on the atmospheric model that is being implemented. If the values of the refractive index have been experimentally determined and refractive index model 36 is comprised of a single memory controlling a single register, atmospheric model 46 could be comprised of a single selector switch.

The vertical dependence of curvature model 30 and index gradient model 36 is determined by altitude zones provided by altitude zone generator 45 in logarithmic relation to the altitude (H) established by signal altitude adder 10 and signal altitude register 12. The output of signal altitude register, therefore, not only provides the altitude of the propagation path, but also acts to control the models 30 and 36 which determine G(H) the change in local elevation angle with respect to range. Because they are logarithmically related to the altitude (H), the altitude zones produced by altitude zone generator 45 become progressively narrower with decreasing altitude. In the preferred embodiment this logarithmic relation in the width of altitude zones is desirable because the curvature model 30 and the refractive index gradient model 36 implement modeling equations (30) and (31) which are an exponential function of altitude. The exponential dependence of the refractive index gradient on altitude means that G(H), the term established by curvature model 30 and refractive index gradient model 36, will vary more rapidly at lower altitudes. However, since the altitude zones at the lower altitudes are narrower, curvature model 30 and index gradient model 36 will be more sensitive to changes in altitude at these lower altitudes and substantially the same accuracy can be obtained as for the higher altitudes. Also, since the rate of change in the local angle of elevation decreases with increasing altitude, increasing the width of the zones at higher altitudes reduces the quantity of data which must be stored in models 30 and 36.

Although the number and size of the altitude zones is a design parameter which can be varied to achieve a compromise between cost and accuracy, in the preferred embodiment of altitude zone generator 45, 12 altitude zones ranging from sea level to 102,400 feet were provided. The first four altitude zones are 1600 feet wide and extend from sea level to 6400 feet. From 6400 feet to 12,800 feet, there are two altitude zones 3200 feet wide. Between 12,800 feet to 25,600 feet, there are two zones 6400 feet wide. From 25,600 feet to 51,200 feet, the zones are 12,800 feet wide. From 51,200 feet to 102,400 feet, the zones are 25,600 feet wide. In the preferred embodiment, only the lowest eight altitude zones of generator 45 are operative with wet term memory 42 because the wet term component of the refractive index gradient model 36 does not make a significant contribution to the change in local elevation angle at higher altitudes.

Even if the curvature model 30 and the refractive index model 36 do not implement equations (30) and (31), but are established in relation to experimentally determined refractive index data, the logarithmic relation in the width of the zones of altitude zone generator 45 would be desirable because the G(H) term would, nevertheless, be most active at the lower altitudes of the propagation path. If measured index data is to be employed, narrower zones than those described above may be necessary to realize an advantage from this more specific information.

Figure 8:
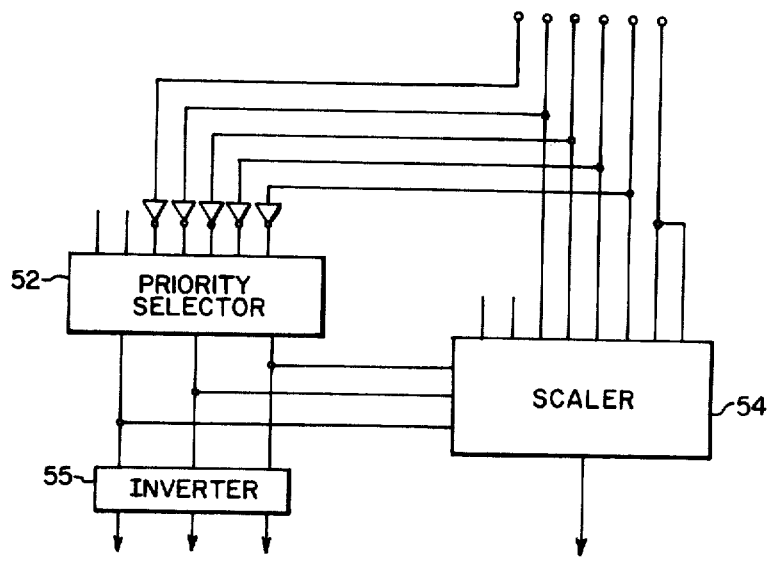
FIG. 8 is a block diagram of the altitude zone generator of FIG. 5.

The altitude zone generator 45, shown in FIG. 8, is comprised of priority selector 52, scaler 54 and inverter 55 and expresses the logarithm of propagation altitude (H) by a characteristic and a mantissa. The characteristic is determined by the location of the most significant one in the eight bit input word, and the mantissa is a function of the less significant bits in the number.

The characteristic is generated by a priority selector 52, which may be comprised of a Fairchild 9318 integrated circuit or equivalent device. The primary output of the priority selector is a 3 bit word provided to inverter 55 whose output indicates the position of the most significant one bit in the input word.

The mantissa is generated by a scaler 54, which may be comprised of a Fairchild 9312 integrated circuit or equivalent device. The scaler 54, which is controlled directly by the priority selector 52, selects those bits to the right of the most significant one in the input word. The most significant bit is not employed in the mantissa, so than an eight bit input word would provide only seven bits to the scaler.

Although signal altitude adder 10 and signal altitude register 12 can determine altitudes below the reference sphere, i.e., below sea level, in the preferred embodiment the $G_2$ values established for curvature model 30 and the $G_1$ values established for refractive index gradient model 36 are evaluated with the assumption that $G_1$ and $G_2$ are not significantly different at altitudes below sea level than at altitudes slightly above sea level. Therefore, curvature model 30 and index gradient model 36 contain no values of $G_1$ or $G_2$ at altitudes below sea level. To provide a G(H) value when the propagation path altitude is below sea level, zero limit 56 (FIG. 5) is provided to convert propagation path altitudes below sea level to sea level altitude before they are processed by altitude zone generator 45. Of course, if curvature model 30 and index gradient model 36 contained sub-sea level values for $G_1$ and $G_2$, the use of zero limit 56 would be unnecessary.

It will be remembered that $\Delta R$ sin(LEA) accumulator 16 and G(H) accumulator 26 preform the range integration of sine(LEA) and G(H) respectively. Accumulators 16 and 26 provide the running integration of sine(LEA) and G(H) respectively by accumulating the total altitude and total local elevation angle change as range R increases. It is, therefore, necessary to determine discrete increments in the range of the propagated signal and control accumulators 16 and 26 in relation to these range increments. The range determination is made in relation to time by range clock 58. For a range clock frequency of 3.8647656 megahertz, assuming a signal propagation speed of $2.997925 \times 10^8$ meters per second, range clock 58 makes 47.75 counts in the time the signal has traveled one nautical mile. Therefore, each range clock pulse represents a range increment of 1/47.75 nautical mile. The contents of accumulators 16 and 26 are updated at each range clock pulse by adding the input determined over the last range increment to the quantity previously determined in relation to prior range increments.

For the range increment of 1/47.75 nautical miles, the $\Delta r$ sine (LEA) generator 18, which is comprised of a National Semiconductor SK0003 Sine/Cosine Look-Up Table Kit multiplied by a constant of 5,212, provides an altitude output with a least significant bit of fifty feet. When the local elevation angle of the propagation path is greater than 23.14°; the altitude of the signal increases by more than fifty feet in one range count. At lower local elevation angles, the altitude output may remain constant for two or more range counts.

The previously described apparatus of FIG. 5 operates to determine the altitude of a signal in the following manner. Before the signal is launched from the transmitting antenna, a human operator enters the antenna altitude in signal altitude adder 10 by selecting the appropriate position of antenna altitude switch 14. The operator then selects the appropriate positions of dry propagation model switch 48 and wet propagation model switch 50 in relation to atmospheric temperature and pressure, and the partial pressure of water vapor plotted on the nomographs of FIGS. 6 and 7. The setting of dry propagation model switch 48 provides the atmospheric index of the dry term components of $G_1$ contained in dry term memory 38 and the setting of wet propagation model switch 50 provides the atmospheric index of the wet term component of $G_1$ contained in wet term memory 42. The setting of switch 48 also provides the atmospheric index of $G_2$ contained in reference curvature memory 32. Antenna shaft encoder 24 has previously digitally encoded the antenna elevation angle (REA) which was transferred through REA register 22 to elevation angle adder 20. Since the signal has not yet been launched and there has been no pulse from range clock 58, G(H) accumulator 26 contributes nothing to elevation adder 20 and adder 20 transfers the angle REA to ΔR sine(LEA) generator 18. ΔR sine (LEA) generator 18 determines the product of ΔR and the sine function of REA and inputs this value to ΔR sin(LEA) accumulator 16.

When a signal is launched from the antenna, signal transmission network 60 causes range clock 58 to deliver a range count pulse to ΔR sine(LEA) accumulator 16 so that ΔR sine(LEA) accumulator, containing the value ΔR sine(REA), enters an incremental height equal to ΔR sine(REA) in signal altitude adder 10 where it is added to the antenna altitude $H_s$ to determine the altitude (H) of the signal propagation path. Altitude (H) is transferred to signal altitude register 12 which provides an output altitude signal to Range-Height indicator 13 and also a feedback altitude signal to zero limit 56.

If the feedback signal provided to zero limit 56 represents an altitude below sea level, zero limit 56 will change this signal to a signal representing a sea level altitude. Otherwise zero limit 56 will not affect the feedback signal.

The output of zero limit 56 is delivered to altitude zone generator 45 which determines an altitude zone signal in logarithmic relation to the zero limit output. The altitude zone signal of altitude zone generator 45 provides the altitude index of a $G_2$ term stored in reference curvature memory 32, the dry term component of a $G_1$ term stored in the dry term memory 38, and the wet term component of a $G_2$ term stored in the wet term memory 42. Therefore, together with the atmospheric indexes previously provided in relation to the settings of dry propagation model switch 48 and wet propagation model switch 50, the altitude zone signal of altitude zone generator 45 determines the $G_2$ term of reference curvature memory 32, the dry term component of the $G_1$ term of dry term memory 38 and the wet term component of the $G_1$ term of wet term memory 42 which are respectively stored in registers 34, 40 and 44.

The $G_2$ term of register 3 and the wet and dry components of the $G_1$ term of registers 40 and 44 are added in G(H) adder 28 to provide the change in local elevation angle over the first range pulse of clock 58. This value is transferred to G(H) accumulator 26 which performs the integration of the G(H) function by maintaining a running summation of outputs of G(H) adder 28. However, the quantity contained in G(H) accumulator 26 is not added to the angle REA contained in elevation angle adder 20 until a pulse is delivered to G(H) accumulator 26 by range clock 58.

Before a pulse is delivered to G(H) accumulator 26, a second range count pulse is provided to ΔR sine(LEA) accumulator 16 by range clock 58 causing a second altitude increment equal to ΔR sin(REA) to be added to the first increment which sum is then entered in signal altitude adder 10 and added to the antenna altitude $H_s$ to provide a second altitude output H to range-height indicator 13 from signal altitude register 12. In a similar manner as with the first output altitude, a second value of G(H) is determined in relation to the second output altitude by G(H) adder 28 and added to the previous G(H) value accumulator 26. This value is still not transferred to elevation angle adder 20 because G(H) accumulator 26 receives no pulse from clock 58 so that the angle in elevation angle adder 20 remains REA.

A third range pulse is then provided by range clock 58 to ΔR sine(LEA) accumulator 16 to produce a third altitude increment and a third output altitude and a third increment in the value of G(H) accumulator 26 in a manner substantially similar to that described for the second pulse. However, before a fourth pulse is provided to ΔR sine(LEA) accumulator 16 by range clock 58, a pulse is provided to G(H) accumulator 26 which causes ∫G(H)dx, the change in local elevation angle stored in G(H) accumulator 26, to be added to the antenna angle REA in elevation angle adder 20. Therefore, on the fourth pulse of range clock 58 to ΔR sine(-LEA) accumulator 16, the altitude increment added to accumulator 16 from ΔR sine(LEA) generator 18 will be determined by the new elevation angle REA + ∫G(H)dx.

The above cycle describes the process for determining the altitude of the propagation path by accumulating altitude increments whose magnitude is determined in relation to the sine function of a periodically updated, local elevation angle of the propagation path. The cycle is thereafter repeated, with four range count pulses from range clock 58 to accumulator 16 between each pulse from range clock 58 to G(H) accumulator 26. The process will continue until it is terminated by the transmission of another signal or by a termination signal by signal transmission network 60.

Range clock 58 provides a pulse rate to accumulator 26 which is only one-fourth as fast as the range pulse rate to accumulator 16 because the curvature of the propagation path determined by accumulator 26 is gradual enough with respect to the propagation range that accuracy in determining the propagation path could not be significantly improved by a faster pulse frequency to accumulator 26.

Figure 9:
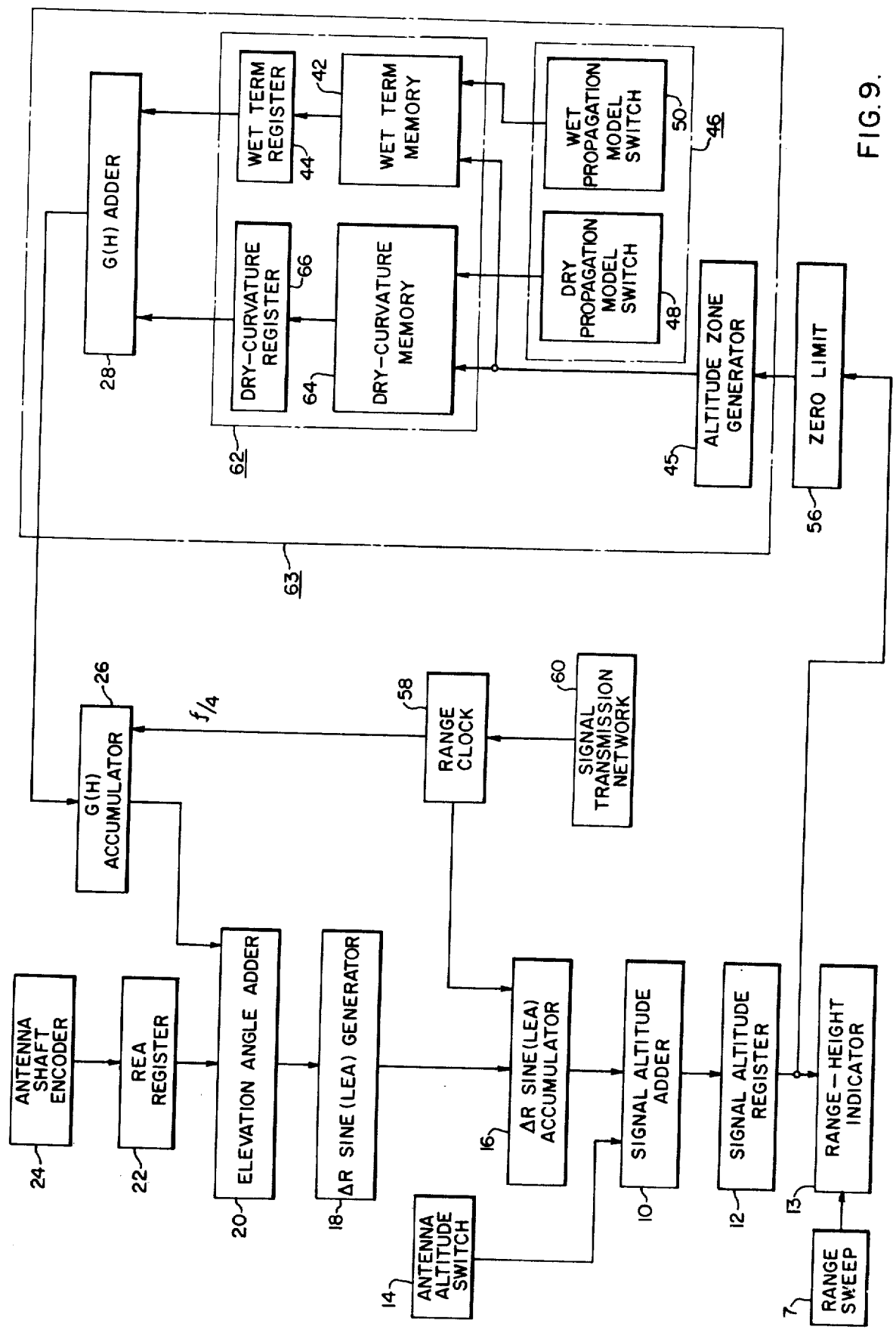
FIG. 9 is a block diagram of a modification of the apparatus represented in the block diagram of FIG. 5.

FIG. 9 represents a modification of the apparatus and method described in relation to FIG. 5, in which curvature model 30 and refractive index gradient model 36 of FIG. 5 have been replaced by gradient-curvature model 62 to provide a LEA gradient-curvature model 63 which includes G(H) adder 28; gradient-curvature model 62; atmospheric model 46; and altitude zone generator 45. Gradient-curvature model 62 is comprised of wet term memory 42 cooperating with wet term register 44, and a dry-curvature memory 64 cooperating with a dry-curvature register 66. The outputs of registers 44 and 66 are added in G(H) adder 28 which determines the inputs to G(H) accumulator 26 in the same manner as previously described.

In substantially the same manner as described in relation to FIG. 5, the inputs to registers 44 and 66 are provided by memories 42 and 64 in relation to a vertical address provided by altitude zone generator 45, and a horizontal address provided by atmospheric model 46. Wet propagation model switch 50 provides the horizontal address to wet term memory 42 and dry propagation model switch 48 provides the horizontal address to dry curvature memory 64. As with memories 32 and 38, memory 64 is comprised of a read-only-memory having twelve vertical addresses and, for each vertical address, ten horizontal addresses. The values of each address are determined by the difference between the curvature term resulting from the curvature of the spherical reference and the dry term component of the curvature resulting from the refractive index gradient. The values stored in read-only-memory 64 are taken as the difference because the curvature relative to the sea level reference and the curvature induced by the dry term of the refractive index are in opposite directions and, therefore, have opposite signs. Read-only-memory 64 thereby permits the simplification of the embodiment of FIG. 5 in that registers 34 and 40 can be replaced by register 66 and read-only-memories 32 and 38 can be replaced by read-only-memory 64.

We claim:

1. A signal processor for determining the altitude of a signal propagated through the atmosphere from the elevation angle and altitude of the transmitting antenna; said processor comprising:

means for encoding the elevation angle of the antenna;

first means for selecting a model of the propagation atmosphere;

second means for selecting an antenna altitude; and means for determining the altitude of said signal in accordance with a predetermined relationship including said antenna elevation angle, said atmospheric propagation model, and said antenna altitude.

2. A signal processor for determining the altitude of a signal transmitted from an antenna and propagated through the atmosphere, said processor comprising:

means for encoding the elevation angle of said antenna;

first means for selecting the altitude of said antenna;

second means for selecting a model atmosphere through which said signal is propagated; and means for determining the propagation path of said signal in relation to said elevation angle, antenna altitude and model atmosphere.

3. A signal processing method for determining the altitude above a reference surface of a signal transmitted from an antenna and propagated through the atmosphere, said method comprising:

selecting the altitude of said antenna, encoding the elevation angle of said antenna;

establishing a model of the atmospheric refractive index gradient;

determining the change in elevation angle of said signal in relation to said refractive index gradient model; and determining the altitude of said propagation path in relation to said change in elevation angle, said encoded antenna elevation angle, and said antenna altitude.

4. The method of claim 3 in which said step of determining the altitude of said propagation path includes:

accumulating changes in said elevation angle with respect to incremental changes in the propagation path of said signal;

adding said accumulated elevation angle changes to said encoded antenna elevation angle;

determining the product of incremental propagation path changes and the SINE function whose argument is the sum of said accumulated elevation angle changes plus said encoded antenna elevation angle;

accumulating said product with respect to incremental changes in the propagation path of said signal.

5. The method of claim 3 in which said step of determining the change in elevation angle of said signal includes:

determining the change of elevation angle in relation to altitude; and determining the change of elevation angle in relation to atmospheric conditions.

6. The method of claim 3 in which said step of determining the change in elevation angle of said signal includes:

determining the change of elevation angle resulting from the atmospheric refractive index gradient in relation to altitude;

determining the change of elevation angle resulting from the curvature of the spherical reference in relation to altitude; and determining the change of elevation angle in relation to atmospheric conditions.

7. The method of claim 3 in which said step of determining the change in elevation angle of said signal includes:

determining the change of elevation angle in relation to altitude;

determining the change in elevation angle resulting from the atmospheric refractive index gradient in relation to atmospheric conditions; and determining the change in elevation angle resulting from the curvature of the reference surface in relation to atmospheric conditions.

8. The method of claim 3 in which said step of determining the change in elevation angle of said signal includes:

selecting at least one of a set of atmospheric conditions;

determining a dry term component of said elevation angle for each member of said set of atmospheric conditions;

determining a wet term component of said elevation angle for each member of said set of atmospheric conditions;

determining a curvature term of an elevation angle in relation to a spherical reference for each member of said set of atmospheric conditions; and adding said dry, wet and curvature component terms respectively associated with said selected member of said atmospheric conditions.

9. A signal processing method for determining the altitude of a signal propagated through an atmosphere from an antenna, said method comprising:

selecting the altitude of said antenna;

encoding the elevation angle of said antenna;

establishing a set of altitude zones;

establishing for each of said zones the change in elevation angle of said signal in relation to predetermined atmospheric conditions; and determining the altitude of the propagation path of said signal in accordance with a predetermined relationship including said antenna altitude, said antenna elevation angle, and said predetermined atmospheric conditions.

10. The method of claim 9 in which said step of determining the altitude of said propagation path includes:

accumulating changes in the elevation angle with respect to incremental changes in the propagation path;

adding said accumulated changes in the elevation angle to said encoded antenna elevation angle;

determining the SINE function whose argument is the sum of said accumulated elevation angle changes and said encoded antenna elevation angle; and accumulating the product of said incremental changes in said propagation path and said SINE function with respect to incremental changes in the propagation path.

11. The method of claim 9 in which said step of establishing for each of said zones the change in elevation angle of said signal includes:

determining a dry term of an elevation angle in relation to said atmospheric conditions;
determining a wet term of an elevation angle in relation to said atmospheric conditions;
determining a curvature term of an elevation angle in relation to a spherical reference in relation to said atmospheric conditions;
selecting at least one member of said atmospheric conditions; and
adding said dry, wet and curvature terms respectively associated with at least said one selected member of said atmospheric conditions.

12. The method of claim 9 including the step of limiting said determined zones of elevation to zones including sea level and selected higher elevations.

13. A signal processor for determining the altitude of a signal propagated through an atmosphere from an antenna, said processor comprising:
means for selecting the altitude of said antenna;
means for encoding the elevation angle of said antenna;
first means for determining the change in elevation angle of said signal in exponential relation to altitude; and
second means for determining the altitude of said propagation path in a predetermined relationship with antenna altitude, antenna elevation angle, and said change in elevation angle.

14. The apparatus of claim 13 in which said means for determining the change in elevation angle of said signal includes:
first means for selecting a wet atmospheric term in relation to atmospheric conditions;
second means for selecting a dry atmospheric term in relation to atmospheric conditions;
third means for selecting a reference curvature term in relation to atmospheric conditions; and
means for adding said wet, dry and curvature terms to provide the change in elevation angle in relation to incremental changes along said propagation path.

15. The apparatus of claim 13 including means for indicating the altitude of said propagation path as a function of the range of said propagation path.

16. A signal processor for determining, relative to a reference surface, the altitude of the propagation path of a signal transmitted from an antenna, said processor comprising:
switching means for determining the altitude of said transmitting antenna;
local elevation angle model means for determining the effects of the earth's curvature and the atmospheric refractive index gradient on the propagation path elevation angle of said transmitted signal;
first accumulating means for determining the change in said elevation angle of said propagation path with respect to incremental changes along said propagation path;
antenna elevation angle encoding means for determining the elevation angle of said antenna;
SINE function generator means for determining the product of incremental range changes and the SINE function whose argument is the sum of said antenna elevation angle encoding means plus said change in said elevation angle of said first accumulating means; and
second accumulating means for determining the altitude of said propagation path with respect to incremental changes along said propagation path.

17. The apparatus of claim 16 in which said antenna elevation angle encoding means includes:
an antenna shaft encoder; and
an antenna elevation angle register.

18. The apparatus of claim 16 in which said SINE function generator means includes:
an elevation angle adder; and
a SINE function generator.

19. The apparatus of claim 16 in which said second accumulator means includes:
an altitude accumulator; and
an altitude register.

20. The apparatus of claim 16 in which said local elevation angle model means includes:
first memory means for indexing the change in elevation angle of said propagation path relative to said spherical reference;
second memory means for indexing the change in elevation angle of said propagation path due to the dry term of a predetermined atmospheric model;
third memory means for indexing the change in elevation angle of said propagation path due to the wet term of a predetermined atmospheric model; and
summing means for adding the change in elevation angle of said first, second and third memory means.

21. The apparatus of claim 20 in which said first, second and third memory means are respectively comprised of first, second and third combinations of read-only memories and registers.

22. The apparatus of claim 16 in which said local elevation angle model means includes:
a dry component switching means for determining a dry atmospheric model in relation to atmospheric temperature and pressure;
a wet component switching means for determining a wet atmospheric model in relation to atmospheric temperature and the partial pressure of water vapor;
first memory means for indexing the change in elevation angle of said propagation path relative to a reference surface;
second memory means for indexing the change in elevation angle of said propagation path due to the dry term of said dry component switching means;
third memory means for indexing the change in elevation angle of said propagation path due to the wet term of said wet component switching means; and
summing means for adding the elevation angle of said first, second and third memory means.

23. The apparatus of claim 22 in which said dry component switching means includes a ten-position switch, and said wet component switching means includes at least two eight-position switches.

24. The apparatus of claim 22 in which said first, second and third memory means respectively include a read-only-memory and a register.

25. The apparatus of claim 16 in which said local elevation angle model means includes:
altitude zone generating means for determining the altitude of said propagation path in relation to predetermined altitude zones;
atmospheric model means for providing a model atmosphere comprised of a dry term component and a wet term component;
first memory means for indexing as a function of said altitude zones the change in elevation angle of said propagation path due to the curvature of said reference surface;

second memory means for indexing as a function of said altitude zones the change in elevation angle of said propagation path relative to a predetermined dry term of said atmospheric model;

third memory means for indexing as a function of said altitude zones the change in elevation angle of said propagation path relative to a predetermined wet term of said atmospheric model; and summing means for adding the change in elevation angle indexed by said first, second and third memory means.

26. The apparatus of claim 25 in which said altitude zone generating means includes:

a priority selector which produces a characteristic term in relation to said accumulating means; and a scaler which produces a mantissa term in relation to said second accumulating means and in relation to said priority selector.

27. The apparatus of claim 25 in which said first, second and third memory means respectively include first, second and third read-only-memories and registers.

28. In a signal processor for determining the altitude of the propagation path of a transmitted signal, in relation to a reference surface, a local elevation angle model comprising:

an atmospheric model including an atmospheric dry term and an atmospheric wet term;

first memory means for indexing the change in elevation angle of said propagation path due to the curvature of said reference surface;

second memory means for indexing the change in elevation angle of said propagation path due to the curvature of the dry term of said atmospheric model;

third memory means for indexing the change in elevation angle of said propagation path due to the wet term of said atmospheric model; and summing means for adding the change in elevation angle indexed by said first, second and third memory means.

29. In a signal processor for determining relative to a reference surface the altitude of the propagation path of a transmitted signal, the combination of:

a dry component switching means for determining a dry atmospheric term in relation to atmospheric temperature and pressure;

a wet component switching means for determining a wet atmospheric term in relation to atmospheric temperature and the partial pressure of water vapor;

first memory means indexing the change in elevation angle of said propagation path relative to the curvature of said reference surface;

second memory means for indexing the change in elevation angle of said propagation path due to the dry term of said dry component switching means;

third memory means for indexing the change in elevation angle of said propagation path due to the wet term of said wet component switching means; and summing means for adding the indexed elevation angle changes of said first, second and third memory means.

30. In a signal processor for determining relative to a spherical reference the altitude of the propagation path of a transmitted signal, an atmospheric model comprising:

altitude zone generating means for determining the altitude of said propagation path in relation to at least one predetermined altitude zone;

first memory means for indexing as a function of said one altitude zone the change in elevation angle of said propagation path relative to said spherical reference;

second memory means for indexing as a function of said one altitude zone the change in elevation angle of said propagation path relative to the dry term of a predetermined atmospheric model;

third memory means for indexing as a function of said one altitude zone the change in elevation angle of said propagation path relative to the wet term of a predetermined atmospheric model; and summing means for adding the change in elevation angle of each of said first, second and third memory means.

31. A signal processing method for determining relative to a spherical reference the altitude of the propagation path of a signal transmitted from an antenna, said method comprising the steps of:

sensing the elevation of said transmitting antenna;

establishing the effects of the earth's curvature and the atmospheric refractive index gradient on the propagation path of said transmitted signal;

accumulating the change in the elevation angle of said propagation path with respect to incremental changes along said propagation path;

encoding the elevation angle of said antenna;

generating the SINE function of the sum of said elevation angle of said antenna plus said change in elevation angle accumulated along said propagation path; and accumulating the change in said SINE function with respect to incremental changes along said propagation path.

32. A method for modeling the effects of the earth's curvature and the atmospheric refractive index gradient on the propagation path of a transmitted signal, said method comprising:

indexing a first change in elevation angle of said propagation path relative to said spherical reference;

indexing a second change in elevation angle of said propagation path due to the dry term of a predetermined atmospheric model;

indexing a third change in elevation angle of said propagation path due to the wet term of a predetermined atmospheric model; and summing said first, second and third changes in elevation angle.

33. A method for establishing in relation to a spherical reference the altitude of the propagation path of a transmitted signal, said method comprising the steps of:

setting a dry component apparatus which determines a dry atmospheric model in relation to atmospheric temperature and pressure;

setting a wet component apparatus which determines a wet atmospheric model in relation to atmospheric temperature and the partial pressure of water vapor, indexing a first change in elevation angle of said propagation path relative to a spherical reference;

indexing a second change in elevation angle of said propagation path due to the dry term of a predetermined atmospheric model;

indexing a third change in elevation angle of said propagation path due to the wet term of a predetermined atmospheric model; and summing the first, second and third changes in elevation angle.

34. A method for establishing the effects of the earth's curvature and the atmospheric refractive index gradient on the propagation path of a transmitted signal, said method comprising the steps of:

determining the altitude of said propagation path in relation to predetermined altitude zones;

indexing as a function of said altitude zones a first change in elevation angle of said propagation path relative to said spherical reference;

indexing as a function of said altitude zones a second change in elevation angle of said propagation path due to the dry term of a predetermined atmospheric model;

indexing as a function of said altitude zones a third change in elevation angle of said propagation path due to the wet term of a predetermined atmospheric model; and summing the first, second and third changes in said elevation angle.

35. A signal processor for determining, relative to a reference surface, the altitude of the propagation path of a signal transmitted from an antenna, said processor comprising:

switching means for determining the altitude of said transmitting antenna;

gradient-curvature model means for determining the effects of the earth's curvature and the atmospheric refractive index gradient on the propagation path elevation angle of said transmitted signal;

first accumulating means for determining the change in said elevation angle of said propagation path with respect to incremental changes along said propagation path;

antenna elevation angle encoding means for determining the elevation angle of said antenna;

sine function generator means for determining the product of incremental range changes and the sine function whose argument is the sum of said antenna elevation angle encoding means plus said change in said elevation angle of said first accumulating means; and second accumulating means for determining the altitude of said propagation path with respect to incremental changes along said propagation path.

36. The apparatus of claim 35 in which said gradient-curvature model means includes:

altitude zone generating means for determining the altitude of said propagation path in relation to predetermined altitude zones;

atmospheric model means for providing a model atmosphere comprised of a dry term component and a wet term component;

gradient-curvature model means for indexing, as a function of said altitude zones, the change in elevation angle of said propagation path due to the curvature of said spherical reference, due to a predetermined dry term of said atmospheric model, and due to a predetermined wet term of said atmospheric model; and summing means for adding the change in elevation angle indexed by said gradient-curvature model means.

37. The apparatus of claim 36 in which said gradient-curvature model means includes:

a wet term memory means for indexing, as a function of said altitude zones, the change in elevation angle of said propagation path relative to a predetermined wet term of said atmospheric model; and a dry curvature memory means for indexing, as a function of said altitude zones, the change in elevation angle of said propagation path relative to a predetermined dry term of said atmospheric model and also in relation to the curvature of said reference surface.

* * * * *